July 9, 1929.  J. LEDWINKA  1,720,336
CLOSED BODY VEHICLE CONSTRUCTION
Filed Jan. 29, 1925

INVENTOR:
Joseph Ledwinka
BY
ATTORNEY.

Patented July 9, 1929.

1,720,336

UNITED STATES PATENT OFFICE.

JOSEPH LEDWINKA, OF PHILADELPHIA, PENNSYLVANIA, ASSIGNOR TO EDWARD C. BUDD MANUFACTURING COMPANY, OF PHILADELPHIA, PENNSYLVANIA, A CORPORATION OF PENNSYLVANIA.

CLOSED-BODY VEHICLE CONSTRUCTION.

Application filed January 29, 1925. Serial No. 5,424.

My invention relates to closed body vehicle construction. It has particularly to do with closed body automobiles.

Its object is to so construct those portions of the body frame lying in the projected paths of movement of the windows thereof as to enable one to obtain the fullest degree of movement of the windows which may be desired. The most common interferent with full window openings is the wheel housing in the tonneau or rear of the car. To secure commodious accommodation and comfort, the bodies of cars are made wider than the wheel bases, and the wheels underlying the overhanging portions of the bodies need be housed in order to maintain the complete closure of the body. The bodies of these wheel housings in particular are almost without exception intersected by the downwardly projected plane of operation of both the rear door and the tonneau windows.

I aim to operate some if not all of these windows to a maximum extent, and, if not all, to operate some to the full degree desired and others to a considerably greater degree than possible at present. I aim to do this without introducing any unprotected openings through which drafts and dust may be admitted, further to accomplish it without encroachment upon the free space required for wheel movements within the housing, still further to attain it without exposing to exterior view any parts which will mar the contour lines of the car, at least to avoid exposing parts which will attract substantial notice, yet further to achieve it without adding any additional parts to the body structure as a whole, and finally to secure all the foregoing ends without interference with freedom of door opening movements when the windows in connection with which my invention is employed happen to be located in the door.

In brief, in that form of invention now best known to me I attain these ends principally by constructing those portions of the body frame which intersect the downwardly projected plane of the window glass to encompass a free space in the region of such intersection adapted to receive the lower edge of the glass when moved downwardly to the extent desired, by enclosing this space by walls supported from the frame members and constituting closed pockets, and the location of the window glass bumpers in the bottoms of these pockets.

That form of my invention now best known to me is shown in the accompanying drawings, of which—

Fig. 3 is a cross section of the salient elements of the combination, taken on line 3—3 of Fig. 2, while

Figure 1:
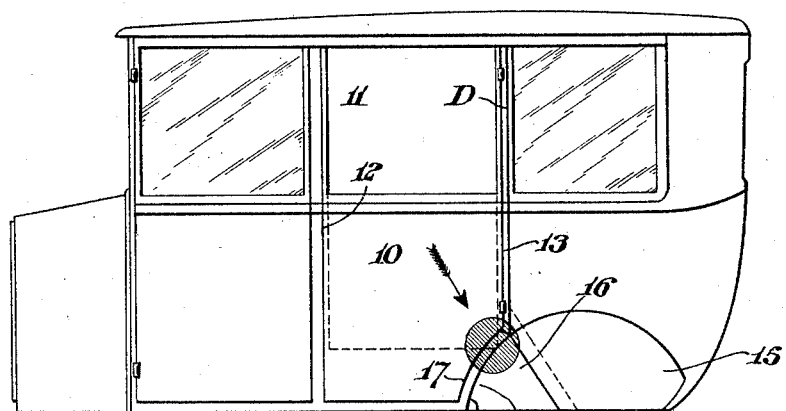
Fig. 1 is a general side elevation of a pressed metal automobile body presented for the purpose of locating, with respect to the other parts of the body, those parts in which my invention is embodied. The shaded circle shows the region of the affected parts.

The embodiment illustrated comprises the rear door 10 of the sedan body. This door is provided with a window 11, adapted to be closed by the substantially vertically sliding window glass 12, the lowermost position of which is indicated by dotted lines. The window glass slides in the relatively fixed main frame of the door, designated generally 13, being mounted in glass run channels 14 (Fig. 2) secured to the vertically extending portions of the frame.

The tonneau or rear portion of the car is provided with a wheel housing structure 15, the fore end of which is formed by an element 16 commonly known as the post D bracket, by reason of the fact that this bracket supports the D post, designated by reference character D, and serves as a common joining member between this post and the bottom sills of the body (not here shown).

This wheel housing 15, of which the post D bracket 16 is a part, encroaches upon what would be a rectangular form of the door frame 13, and lies in the downward projection of the plane of the sliding window glass 12. The lower rear corner of the frame 13 of door 10 is made vertically oblique to conform complementally to the fore face of the post D bracket 16. This oblique portion is designated 17, and the complementally oblique face of the post D bracket is designated 18

Figure 3:
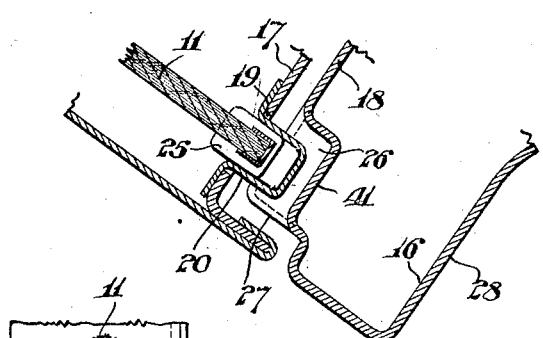

(see Fig. 3). From Fig. 3 it will be noted that the fore portion of the body of the post D bracket is of channel section and of considerable depth. Thereby it is adapted not only to support the D post, which is of channel section in continuation of its upper end, but adequately to found this D post upon the bottom sill of the car despite the fact that its base is removed a considerable distance from the vertical projection of the lower end of the D post itself.

In the region of the intersection of the oblique portion of the door frame with the downwardly projected plane of the glass, portion 17 is apertured as at 19, and thereby made to encompass the free space adapted to accommodate the lower rear corner of the window glass. This space is enclosed by the walls 20 of an angular pocket forming member having a bottom wall 21 substantially at right angles to the projected line of the glass run channel 14, and a side wall 22 in line therewith. This pocket member is provided with a flanged mouth, and it is secured in place by welding these flanges (designated generally 23) to the inner face of the portion 17 of the door frame.

Figure 2:
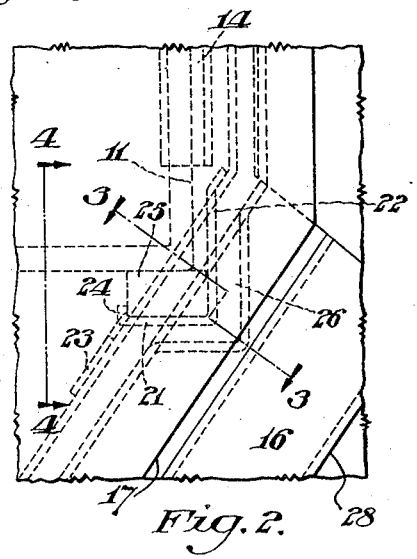
Fig. 2 is a side elevation of these affected parts.
Figure 4:
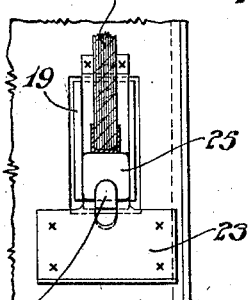
Fig. 4 is a sectional elevation taken from the plane indicated by the line 4—4 of Fig. 2 and in general in the direction of the arrows, as usual.

Struck up from the body of the bottom flange 23 is a vertically extending tongue 24. Between this tongue 24 and the vertically extending wall 22 of the pocket is confined a window glass bumper 25 of cubical form substantially as shown in Figs. 2 to 4. The walls of the pocket 20 therefore serve as a bumper bracket, and the necessity for providing such a member in other placement is obviated.

Also in the region intersected by the downwardly projected plane of operation of the window glass 12, the fore surface 18 of the post D bracket 16 is recessed interiorly of the body of the post D bracket constituted by the channel section of the bracket shown in Fig. 3. Through the formation of this recess, the bracket is made to encompass a free space in the region of its intersection with the projected plane of the glass. The recess is formed by bodily depressing surface 18 of the stamping constituting the post D bracket, to form a pocket 26 complemental in form to the pocket 20 and adapted to receive within its body and house that pocket with satisfactory clearance, as indicated. Moreover, this pocket 26 is open on its front side as at 27, to permit free swinging movement of pocket 20 into and out of its body irrespective of radius from the hinge axis of the door.

So I am able to greatly increase the range of sliding movement of the window glass and at the same time to economically and efficiently house the bumper therefor. In the embodiment illustrated I am enabled to secure a degree of movement of the rear window glass coextensive with the degree of movement of the window glass of the front door of the car, and without having to utilize anywhere near all of the available movement. For, as will be readily apprehended from a survey of Fig. 2, the pocket 26 may be projected downwardly to a very considerably greater depth before it actually intersects the exterior wall 28 of the wheel housing itself. By reason of the obliquity of the channeled fore-body of the post D bracket 16, the vertically projected depth of body at this point is very considerably in excess of the depth transversely to the body. Several inches of free space are thereby rendered available without such encroachment upon the free space within the wheel housing 15 as might be made if the bottom of pocket 26 were projected through the housing wall 28.

Not only may the same principle be applied to embody my invention in other portions of the wheel housing, but my invention may also be applied to other body elements without departing in any wise from its generic spirit. All such modifications and adaptations of my invention should without doubt be comprised by the annexed claims.

What I claim is:

1. In a closed body vehicle, a sliding window glass, and relatively fixed door frame in which said glass is mounted for sliding movement, which door frame has an oblique lower portion intersecting the fully downward position of said sliding window glass, and which oblique portion is provided with a freely opened space in the region of such intersection adapted to accommodate a portion of the lower edge of the glass when it is lowered into the said downward position.

2. In a closed body vehicle, a sliding window glass, and relatively fixed door frame in which said glass is mounted for sliding movement, which door frame has an oblique lower portion intersecting the fully downward position plane of said sliding window glass, and which oblique portion is provided with an aperture in the region of such intersection adapted to accommodate a portion of the lower edge of the glass when it is in said fully downward position, together with walls enclosing said free space forming a pocket into which the lower edge of the glass is received.

3. In a closed body vehicle, a sliding window glass, and relatively fixed door frame in which said glass is mounted for sliding movement, which door frame has an oblique lower portion intersecting the downwardly projected plane of said sliding window glass, and which oblique portion is provided with a freely opened space in the region of such intersection adapted to accommodate a portion of the lower edge of the glass when it is lowered into the position of said projected plane, together with walls enclosing said free space and forming a glass receiving pocket at substantially right angles to one edge of the glass, and a bumper in the bottom of the pocket.

4. A closed body vehicle, a door having window glass runs in a determinate plane, and a frame having an oblique portion which intersects the downwardly projected plane of said window glass, which frame encompasses a free space in the region of said intersection adapted to receive a portion of the lower edge of the glass, and a flanged glass receiving pocket stamping accommodated in said free space and secured to the door frame through engagement of its flanges with the interior faces of the frame.

5. In a closed body vehicle, a door having window glass runs in a determinate plane, and a frame having an oblique portion which intersects the downwardly projected plane of said window glass, which frame encompasses a free space in the region of said intersection adapted to receive a portion of the lower edge of the glass, a flanged glass receiving pocket stamping accommodated in said free space and secured to the door frame through engagement of its flanges with the interior faces of the frame, and a tongue struck up from the lower of the pocket flanges and constituting a bumper securing means.

6. In a closed body vehicle, a door provided with a vertically sliding window, and a post bracket beneath said door having a face intersecting the fully downward position of the window glass and encompassing in its front face a recess adapted to receive the lower edge of the window glass when projected below the door frame.

7. In a closed body vehicle a sliding window glass in a door, a relatively fixed door frame having an oblique lower portion intersecting the downwardly projected plane of said glass and provided with a glass receiving pocket to receive the lower edge of the glass when projected beyond the oblique line of the frame in the region of said intersection, a post bracket having an oblique surface complemental to the oblique portion of said door, and a pocket in said surface adapted to receive and house the first-named pocket.

8. A post bracket having a transverse door jamb face vertically inclined and provided with a recess extending substantially vertically downward into the body of the bracket from the exterior of said face.

9. In a vehicle body, a door provided with a sliding window panel and a relatively fixed frame therefor having a lower portion in the downwardly projected plane of the window, said lower portion of the frame being formed with an upwardly open recess to receive the lower portion of the sliding window panel when the same is in its fully lowered position.

In testimony whereof I hereunto affix my signature.

JOSEPH LEDWINKA.